US012774395B2

(12) United States Patent
Zavgorodnya et al.

(10) Patent No.: US 12,774,395 B2
(45) Date of Patent: Oct. 27, 2026

(54) USE OF POLYPHENOL COMPOUNDS AND HYDROPHILIC POLYMERS FOR REDUCING OR PREVENTING COLLOIDS ADHESION AND/OR FOULING ON A SUBSTRATE

(71) Applicant: SPECIALTY OPERATIONS FRANCE, Lyons (FR)

(72) Inventors: Oleksandra Zavgorodnya, Andalusia, PA (US); Denis Bendejacq, Philadelphia, PA (US); Laura Gage, Lawrenceville, NJ (US)

(73) Assignee: SPECIALTY OPERATIONS FRANCE, Lyons (FR)

( * ) Notice: Subject to any disclaimer, the term of this patent is extended or adjusted under 35 U.S.C. 154(b) by 447 days.

(21) Appl. No.: 17/615,799

(22) PCT Filed: Jun. 3, 2020

(86) PCT No.: PCT/US2020/035837
§ 371 (c)(1),
(2) Date: Dec. 1, 2021

(87) PCT Pub. No.: WO2020/263516
PCT Pub. Date: Dec. 30, 2020

(65) Prior Publication Data

US 2022/0306891 A1 Sep. 29, 2022

Related U.S. Application Data

(60) Provisional application No. 62/868,102, filed on Jun. 28, 2019.

(30) Foreign Application Priority Data

Sep. 30, 2019 (EP) .................................... 19306231

(51) Int. Cl.
*C09D 133/10* (2006.01)
*C09D 171/12* (2006.01)

(52) U.S. Cl.
CPC ......... *C09D 133/10* (2013.01); *C09D 171/12* (2013.01)

(58) Field of Classification Search
CPC ........................... C09D 133/10; C09D 171/12
See application file for complete search history.

(56) References Cited

U.S. PATENT DOCUMENTS

2013/0048563 A1 2/2013 Khwaja et al.
2014/0206630 A1* 7/2014 Messersmith .......... A01N 31/16 427/256
2017/0224876 A1* 8/2017 Babcock ................. A61L 31/16
2018/0147326 A1* 5/2018 Kizhakkedathu ....... A61L 29/14
2018/0292575 A1 10/2018 Jan
2019/0154683 A1* 5/2019 Jiang ................ G01N 33/54393

FOREIGN PATENT DOCUMENTS

EP 0810239 B1 9/2000
EP 3486694 A1 5/2019

OTHER PUBLICATIONS

Supplementary European Search Report issued in European Application No. EP20833309 mailed on Jun. 27, 2023 (2 pages).
Ren, et al., "Highly Stable, Protein-Resistant Surfaces via the Layer-by-Layer Assembly of Poly(sulfobetaine methacrylate) and Tannic Acid", American Chemical Society, vol. 31, No. 21, May 20, 2015 (8 pages).
M. Gauthier, et al., "Sulfobetaine Zwitterionomers Based on n-Butyl Acrylate and 2-Ethoxyethyl Acrylate: Monomer Synthesis and Copolymerization Behavior", Journal of Polymer Science, 2002, vol. 40, No. 4, pp. 511-523.
W-F Lee, et al., "Synthesis and solubility of the poly(sulfobetaine)s and the corresponding cationic polymers: 1. Synthesis and characterization of sulfobetaines and the corresponding cationic monomers by nuclear magnetic resonance spectra", Polymer, 1994, vol. 35, No. 10, pp. 2210-2217.
V. M. Monroy Soto, et al., "Poly(sulphopropylbetaines): 1. Synthesis and characterization", Polymer, 1984, vol. 25, No. 1, pp. 121-128.
P. Koberle, et al., "Hydrophobically Modified Zwitterionic Polymers: Synthesis, Bulk Properties, and Miscibility with Inorganic Salts" Macromolecules, 1994, vol. 27, No. 8, pp. 2165-2173.
V. M. Castano, et al., "Evidence of ionic aggregates in some ampholytic polymers by transmission electron microscopy", Journal of Materials Research, 1990, vol. 5, No. 3, pp. 654-657.
J. C. Salamone, et al., "Aqueous solution properties of a poly(vinyl imidazolium sulphobetaine)", Polymer, 1978, vol. 19, No. 10, pp. 1157-1162.
P. Favresse et al., "New poly(carbobetaine)s made from zwitterionic diallylammonium monomers", Macromolecular Chemistry and Physics, 1999, vol. 200, No. 4, pp. 887-895.
Marie Laure Pujol-Fortin, et al., "Poly(ammonium alkoxydicyanatoethenolates) as New Hydrophobic and Highly Dipolar Poly(zwitterions). 1. Synthesis", Macromolecules, 1991, vol. 24, No. 16, pp. 4523-4530.
Database Pubchem Compound [online] Pubchem; Dec. 5, 2007, Anonymous: "4'-Hydroxyflavan", Database accession No. 20452436.

* cited by examiner

*Primary Examiner* — Dah-Wei D. Yuan
*Assistant Examiner* — Kristen A Dagenais
(74) *Attorney, Agent, or Firm* — Osha Bergman Watanabe & Burton LLP

(57) ABSTRACT

The present disclosure relates to a method for reducing or preventing colloids adhesion and/or fouling on a substrate in need thereof by forming a coating having a first layer that includes a polyphenol compound, and a second layer that includes a hydrophilic polymer having repeating units derived from one or more zwitterionic monomers, typically one or more betaine monomers, on the substrate. The present disclosure also relates to the coating made thereby and an article having the said coating.

13 Claims, No Drawings

USE OF POLYPHENOL COMPOUNDS AND HYDROPHILIC POLYMERS FOR REDUCING OR PREVENTING COLLOIDS ADHESION AND/OR FOULING ON A SUBSTRATE

This application is a U.S. national stage entry under 35 U.S.C. § 371 of International Application No. PCT/US2020/035837 filed Jun. 3, 2020, which claims priority to U.S. Provisional Application No. 62/868,102 filed on Jun. 28, 2019, and to European Patent Application No. 19306231.2 filed on Sep. 30, 2019. The entire content of each of these applications are incorporated herein by reference for all purposes.

FIELD OF THE INVENTION

The present invention relates to the field of reducing or preventing colloids adhesion and/or fouling on a substrate using polyphenol compounds and hydrophilic polymers.

BACKGROUND

In general, fouling is the accumulation of unwanted material on solid surfaces to the detriment of function. Fouling is usually distinguished from other surface-growth phenomena, in that it occurs on a surface of a component, system or plant performing a defined and useful function, and that the fouling process impedes or interferes with this function. Fouling phenomena are common and diverse, ranging from fouling of ship hulls, natural surfaces in the marine environment, fouling of heat-transfer components in heating and cooling systems through ingredients contained in the cooling water, fouling of metal tools and components in the metal industry, for example, in metal working, like cutting and drilling, among other examples. Fouling materials are also diverse and include materials such as colloids.

Colloidal particles include inorganic colloids, such as, for example, clay particles, silicates, iron oxy-hydroxides and the like; organic colloids, such as proteins and humic substances; and even living material, including but not limited to bacteria, fungi, archaea, algae, protozoa, and the like. In some cases, the adherence of colloidal living material, including but not limited to bacteria, fungi, archaea, algae, protozoa, and the like, including proteins and by-products produced by such living material, together and to a surface results in a matrix or film known as a biofilm. In the industrial sector, biofilms cause corrosion, reduce heat exchange in exchangers and give rise to flow resistance in tubes and pipes. In the health sector, it is acknowledged that biofilm formation could be the source of many cases of nosocomial diseases, particularly if the biofilm fixes on surgical materials or in air conditioning or refrigeration systems.

Thus, there is an ongoing need for new or improved methods and compositions for reducing or preventing colloids adhesion and/or fouling.

SUMMARY OF THE INVENTION

This objective, and others which will become apparent from the following detailed description, are met, in whole or in part, by the methods and/or processes of the present disclosure.

In a first aspect, the present disclosure relates to a method for reducing or preventing colloids adhesion and/or fouling on a substrate in need thereof, the method comprising forming a coating having a first and a second layer on the substrate by:

a) contacting the substrate with an aqueous composition comprising a polyphenol compound, wherein the pH of the aqueous composition is at least 7, to form the first layer, b) contacting the first layer formed in step a) with an aqueous composition comprising a polymer having repeating units derived from one or more zwitterionic monomers, typically one or more betaine monomers, to form the second layer; thereby forming the coating for reducing or preventing colloids adhesion and/or fouling on the substrate.

In a second aspect, the present disclosure relates to a coating formed by the method described herein.

In a third aspect, the present disclosure relates to an article comprising a surface, wherein the surface is at least partially coated with the coating described herein.

In a fourth aspect, the present disclosure relates to use of the coating described herein.

DETAILED DESCRIPTION

As used herein, the terms “a”, “an”, or “the” means “one or more” or “at least one” and may be used interchangeably, unless otherwise stated.

As used herein, the term “comprises” includes “consists essentially of” and “consists of.” The term “comprising” includes “consisting essentially of” and “consisting of.”

Unless defined otherwise, all technical and scientific terms used herein have the same meaning as is commonly understood by one of skill in the art to which this specification pertains.

As used herein, and unless otherwise indicated, the term “about” or “approximately” means an acceptable error for a particular value as determined by one of ordinary skill in the art, which depends in part on how the value is measured or determined. In certain embodiments, the term “about” or “approximately” means within 1, 2, 3, or 4 standard deviations. In certain embodiments, the term “about” or “approximately” means within 50%, 20%, 15%, 10%, 9%, 8%, 7%, 6%, 5%, 4%, 3%, 2%, 1%, 0.5%, or 0.05% of a given value or range.

Also, it should be understood that any numerical range recited herein is intended to include all sub-ranges subsumed therein. For example, a range of “1 to 10” is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

Throughout the present disclosure, various publications may be incorporated by reference. Should the meaning of any language in such publications incorporated by reference conflict with the meaning of the language of the present disclosure, the meaning of the language of the present disclosure shall take precedence, unless otherwise indicated.

The present disclosure relates to a method for reducing or preventing colloids adhesion and/or fouling on a substrate in need thereof, the method comprising forming a coating having a first and a second layer on the substrate by:

a) contacting the substrate with an aqueous composition comprising a polyphenol compound, wherein the pH of the aqueous composition is at least 7, to form the first layer, b) contacting the first layer formed in step a) with an aqueous composition comprising a polymer having repeating units derived from one or more zwitterionic monomers, typically one or more betaine monomers, to form the second layer; thereby forming the coating for reducing or preventing colloids adhesion and/or fouling on the substrate.

As used herein, colloids refer to insoluble particles of a substance that are microscopically dispersed or suspended throughout another substance, typically an aqueous medium. Colloids and the substance in which they are dispersed or suspended throughout are collectively referred to as colloidal suspensions. Typically, the colloid does not settle or would take a very long time to settle appreciably. Colloidal particles include inorganic colloids, such as, for example, clay particles, silicates, iron oxy-hydroxides and the like; organic colloids, such as proteins and humic substances; and even living material, including but not limited to bacteria, fungi, archaea, algae, protozoa, and the like. In some cases, the adherence of colloidal living material, such as bacteria, fungi, archaea, algae, protozoa, and the like, including proteins and by-products produced by such living material, together and to a surface results in a matrix or film known as a biofilm. Exemplary bacteria include but are not limited to bacteria selected from the group consisting of: *Pseudomonas* spp., such as *Pseudomonas aeruginosa, Azotobacter vinelandii, Escherichia coli, Corynebacterium diphteriae, Clostridium botulinum, Streptococcus* spp., *Acetobacter, Leuconostoc, Betabacterium, Pneumococcus, Mycobacterium tuberculosis, Aeromonas, Burkholderia, Flavobacterium, Salmonella, Staphylococcus, Vibrio* spp., *Listeria* spp., and *Legionella* spp.

Fouling, in general, is the accumulation of unwanted material on solid surfaces to the detriment of function. Fouling is usually distinguished from other surface-growth phenomena in that it occurs on a surface of a component, system, or plant performing a defined and useful function, and that the fouling process impedes or interferes with this function. The colloids adhesion described herein may be considered fouling.

In accordance with the present disclosure, reducing colloids adhesion and/or fouling refers to decreasing the amount of colloids adhesion and/or fouling already on a surface. Preventing colloids adhesion and/or fouling refers to partial or complete inhibition of colloids adhesion and/or fouling on a surface. Prevention also includes slowing down colloids adhesion and/or fouling on a surface.

Without wishing to be bound by theory, one way the adhesion of colloids and general fouling is believed to be reduced and/or prevented is by means of a physical mechanism, i.e., a repulsive barrier. The repulsive barrier is believed to be the result of the steric bulk of polymer chains, and the hydration layer formed around hydrophilic functions on the polymer chains of the polymer used according to the present disclosure. For instance, bacteria cell walls are made of peptidoglycans, and they are hence also repelled by the repulsive barrier, which results in less bacterial colonization on surfaces, and less formation of biofilm.

In an embodiment, the method for reducing or preventing colloids adhesion and/or fouling on a substrate in need thereof is a method for reducing or preventing biofilm adhesion on a substrate in need thereof.

Because biofilm formation is reduced or prevented by what is believed to be a repulsive barrier, a biocide is typically not required. Thus, in some embodiments, the compositions are free of biocide.

Without wishing to be bound by theory, another way the adhesion of colloids and general fouling is believed to be reduced and/or prevented is by means of increasing susceptibility of living materials, including but not limited to bacteria, fungi, archaea, algae, protozoa, and the like, to biocide.

In other embodiments, the aqueous composition used in step a) and/or the aqueous composition used in step b) may contain biocide. When biocide is present in the composition, it is generally in an amount not exceeding 1000% by weight, typically in an amount not exceeding 500% by weight, more typically in an amount not exceeding 250% by weight, relative to the weight of the hydrophilic polymer used.

In step a) of the method, the substrate is contacted with an aqueous composition comprising a polyphenol compound to form a first layer. The aqueous composition comprises water and the polyphenol compound.

Polyphenol compounds make up a class of compounds that are mainly natural in origin, but may also be synthetic or semisynthetic, and are characterized by the presence of large multiples of phenol structural units. Suitable polyphenol compounds include tannins, which are composed of two sub-classes: hydrolyzable tannins and condensed tannins.

Hydrolyzable tannins include esters of polyol core moieties, such as sugars. The sugar is usually D-glucose but may include other sugars such as cyclitols, quinic acid, shikimic acids, glucitol, hammamelose, and quercitol, among others. The hydroxyl groups of the sugar are partially or totally esterified with phenolic groups such as gallic acid, polymeric galloyl esters thereof, and/or oxidatively cross-linked galloyl groups, such as ellagic acid and gallagic acid. Gallotannins, for example, are polygalloyl esters, and ellagitannins are ellagic acid esters. Hydrolyzable tannins can be hydrolyzed by weak acids or weak bases to produce carbohydrate and phenolic acids.

Condensed tannins are also known as proanthocyanidins and are widely distributed in plant sources such as cranberries and other sources. Proanthocyanidins are polymers of flavan-3-ols and flavans linked through interflavan bonds. Proanthocyanidins can have various types of interflavan linkages, including B-type and A-type linkages. B-type interflavan linkages are defined by the presence of C4→C8 or C4→C6 interflavan bonds. A-type interflavan linkages are defined by the presence of C4→C8 and C2→O→C7 interflavan bonds. The linkages can be $\alpha$ or $\beta$.

Monomers that may be polymerized in the proanthocyanidins include, without limitation, catechin, epicatechin, epigallocatechin, epicatechin gallate, epigallocatechin gallate, epiafzelechin, fisetinidol, guibourtinidol, mesquitol, and robinetinidol, among others. Proanthocyanidins may also be glycosylated with any glycone moiety at one or more positions, such as on an otherwise pendant hydroxyl group. Types of glycone moieties include, without limitation, glycopyranosyl glycones, furanosyl glycones, oligosaccharides (diglycosides, triglycosides, etc.), and amino glycone derivatives. Examples of glycopyranosyl structures include glucuronic acid, glucose, mannose, galactose, gulose, allose, altrose, idose, and talose. Examples of furanosyl structures include those derived from fructose, arabinose, or xylose. Examples of diglycosides (i.e., glycone moieties with 2 glycone units) include sucrose, cellobiose, maltose, lactose, trehalose, gentiobiose, and melibiose. Examples of triglycosides (i.e., glycone moieties with 3 glycone units) include raffinose or gentianose. Examples of amino derivatives include N-acetyl-D-galactosamine, N-acetyl-D-glucosamine, N-acetyl-D-mannosamine, N-acetylneuraminic acid, D-glucosamine, lyxosylamine, D-galactosamine, and the like.

In an embodiment, the polyphenol compound is a compound represented by the following formula:

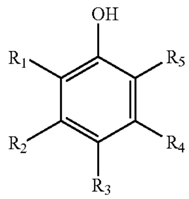

wherein $R_1$ and $R_5$ are each, independently, H, —OH, or —$OG_1$;

$R_2$ and $R_4$ are each, independently, H or —OH;

$R_3$ is H, —OH,

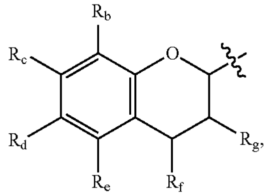

or —(C═O)$R_h$, wherein $R_b$, $R_c$, $R_d$, $R_e$, $R_f$, $R_g$, and $R_h$ are each, independently, H, —OH, —OSu, or —$OG_2$, wherein Su is

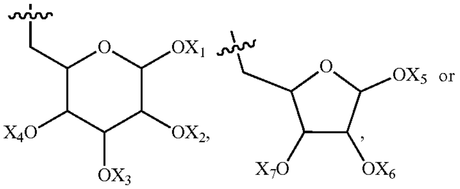

or

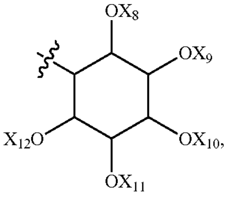

wherein $X_1$, $X_2$, $X_3$, $X_4$, $X_5$, $X_6$, $X_7$, $X_8$, $X_9$, $X_{10}$, $X_{11}$, and $X_{12}$ are each, independently, H or $G_3$, wherein $G_1$, $G_2$, and $G_3$ are each, independently,

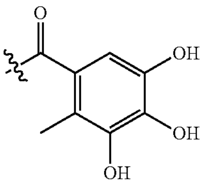

or

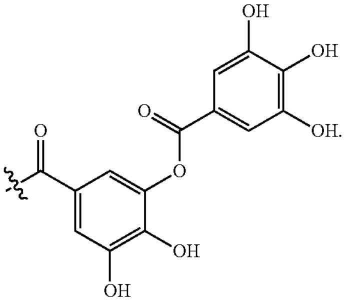

In an embodiment, $R_1$ is —OH and $R_5$ is —$OG_1$.

In another embodiment, $R_2$ is H and $R_4$ is H.

In another embodiment, $R_3$ is —(C═O)$R_h$, typically —(C═O)OSu.

In yet another embodiment, Su is

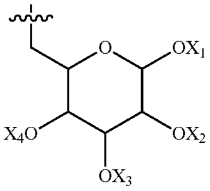

in which $X_1$, $X_2$, $X_3$, and $X_4$ are each

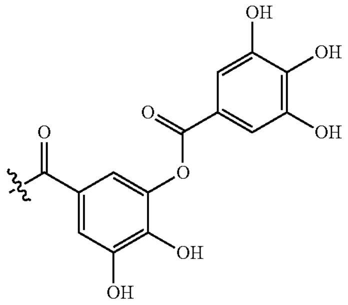

and wherein $G_1$ is

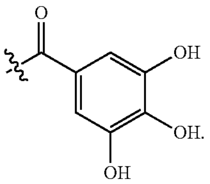

The polyphenol compound used in the method described herein may be in monomeric form and/or in polymeric form. As used herein, chemical structures of suitable polyphenol compounds represent the monomeric form of the polyphenol compounds. However, the present disclosure contemplates that the suitable polyphenol compounds can be in polymeric form or a mixture of the polyphenol compounds in monomeric form and polymeric form. Good results were obtained with tannic acid.

Suitable polyphenol compounds may be obtained by extraction directly from natural sources, such as plant sources, obtained from commercial sources, or synthesized or modified according to methods known to those of ordinary skill in the art. Natural sources of polyphenol compounds include, but are not limited to, cranberries, blueberries, grapes, sorghum, pine, pomegranates, strawberries, raspberries, blackberries, sumac (*Rhus coriaria*), chestnut wood (*Castanea sativa*), oak wood (*Quercus robur, Quercus petraea* and *Quercus alba*), tara pods (*Caesalpinia spinosa*), gallnuts (*Quercus infectoria* and *Rhus semialata*), myrobalan (*Terminalia chebula*), and Aleppo gallnuts (*Andricus kollari*), among others.

The pH of the aqueous composition comprising the polyphenol compound is at least 7. In an embodiment, the pH of the aqueous composition comprising the polyphenol compound is from 7 to 9, typically from 7.5 to 8.5, more typically from 7.6 to 8.0. The pH may be adjusted to be at least 7, such as from 7 to 9, typically from 7.5 to 8.5, more typically from 7.6 to 8.0, by means well-known to those of ordinary skill in the art, such as, for example, by adding suitable quantities of acid or base.

The purity of the polyphenol compound used is not particularly limited. However, a purity of at least 80%, typically at least 90%, is suitable.

The concentration of the polyphenol compound in the aqueous solution is not particularly limited. However, a concentration of the polyphenol compound in the aqueous solution in the range of from about 0.1 mg/mL to about 10 mg/mL, typically from about 0.1 to about 2 mg/mL, is suitable.

The aqueous composition comprising the polyphenol compound may further comprise one or more water-miscible organic solvents, such as, for example, acetone, acetonitrile, 1,2-butanediol, 1,3-butanediol, 1,4-butanediol, 2-butoxyethanol, diethanolamine, diethylenetriamine, dimethylformamide (DMF), dimethoxyethane, dimethyl sulfoxide (DMSO), 1,4-dioxane, ethanol, ethylamine, ethylene glycol, furfuryl alcohol, glycerol, methanol, methyl diethanolamine, methyl isocyanide, N-methyl-2-pyrrolidone, 1-propanol, 1,3-propanediol, 1,5-pentanediol, 2-propanol, propylene glycol, pyridine, tetrahydrofuran (THF), triethylene glycol, and the like.

The aqueous composition may further comprise water-soluble salts, such as, for example, alkali metal halides and alkaline earth halides. There is no particular limitation to the amount of water-soluble salts present in the aqueous composition. However, the aqueous composition comprising the polyphenol compound may further comprise water-soluble salts in an amount of from about 0.01 to about 1.0 M, typically from about 0.1 to about 0.7 M.

The aqueous composition may further comprise buffering agents. Suitable buffering agents include, but are not limited to, 2-(N-morpholino)ethanesulfonic acid (MES), 2,2-bis(hydroxymethyl)-2,2',2"-nitrilotriethanol (Bis-Tris), N-(2-acetamido)iminodiacetic acid (ADA), N-(2-acetamido)-2-aminoethanesulfonic acid (ACES), 1,4-piperazinediethanesulfonic acid (PIPES), β-Hydroxy-4-morpholinepropanesulfonic acid (MOPSO), 1,3-bis[tris(hydroxymethyl)methylamino]propane (Bis-Tris Propane), N,N-bis(2-hydroxyethyl)-2-aminoethanesulfonic acid (BES), 3-(N-morpholino)propanesulfonic acid (MOPS), 2-[(2-hydroxy-1,1-bis(hydroxymethypethyl)amino]ethanesulfonic acid (TES), 4-(2-hydroxyethyl)piperazine-1-ethanesulfonic acid (HEPES), 3-(N,N-bis[2-hydroxyethyl]amino)-2-hydroxypropanesulfonic acid (DIPSO), 4-(N-morpholino)butanesulfonic acid (MOBS), 2-hydroxy-3-[tris(hydroxymethyl)methylamino]-1-propanesulfonic acid (TAPSO), 2-amino-2-(hydroxymethyl)-1,3-propanediol (Trizma), 4-(2-hydroxyethyl)piperazine-1-(2-hydroxypropanesulfonic acid) (HEPPSO), piperazine-1,4-bis(2-hydroxypropanesulfonic acid) (POPSO), triethylamine (TEA), 4-(2-hydroxyethyl)-1-piperazinepropanesulfonic acid (EPPS), N-[tris(hydroxymethyl)methyl]glycine (tricine), diglycine (Gly-Gly), N,N-bis(2-hydroxyethyl)glycine (bicine), N-(2-hydroxyethyl)piperazine-N'-(4-butanesulfonic acid) (HEPBS), N-[tris(hydroxymethyl)methyl]-3-aminopropanesulfonic acid (TAPS), 2-amino-2-methyl-1,3-propanediol (AMPD), N-tris(hydroxymethyl)methyl-4-aminobutanesulfonic acid (TABS), N-(1,1-dimethyl-2-hydroxyethyl)-3-amino-2-hydroxypropanesulfonic acid (AMPSO), 2-(cyclohexylamino)ethanesulfonic acid (CHES), 3-(cyclohexylamino)-2-hydroxy-1-propanesulfonic acid (CAPSO), 2-amino-2-methyl-1-propanol (AMP), 3-(cyclohexylamino)-1-propanesulfonic acid (CAPS), 4-(cyclohexylamino)-1-butanesulfonic acid (CABS), tris(hydroxymethyl)aminomethane (TRIS), phosphoric acid, salts thereof, and mixtures thereof.

In step b) of the method described herein, the first layer formed in step a) is contacted with an aqueous composition comprising a polymer having repeating units derived from one or more zwitterionic monomers, typically one or more betaine monomers, to form a second layer. The aqueous composition comprises at least water and the polymer having repeating units derived from one or more zwitterionic monomers.

The polymer of the present disclosure comprises repeating units derived from one or more zwitterionic monomers, typically one or more betaine monomers. Such polymers are considered hydrophilic, or "water-loving", due to the presence of positive and negative charges provided by the zwitterionic monomers. The hydrophilic polymer may be a homopolymer or a copolymer. In the case when the polymer is a copolymer, the polymer may be a block copolymer, branched copolymer, or statistical copolymer. In an embodiment, the polymer having repeating units derived from one or more zwitterionic monomers is a homopolymer. In another embodiment, the polymer having repeating units derived from one or more zwitterionic monomers is a copolymer.

Unless otherwise indicated, when molar mass is referred to, the reference will be to the weight-average molar mass, expressed in g/mol. The latter can be determined by aqueous gel permeation chromatography (GPC) with light scattering detection (DLS or alternatively MALLS), with an aqueous eluent or an organic eluent (for example dimethylacetamide, dimethylformamide, and the like), depending on the polymer. There is no particular limitation to the molar mass of the polymer. However, in an embodiment, the weight-average molar mass (Mw) of the polymer is in the range of from about 5,000 to about 3,000,000 g/mol, typically from about 7000 to about 2,000,000, g/mol, more typically from about 35,000 to 1,900,000 g/mol.

As used herein, zwitterionic monomers refer to monomers capable of polymerization that are neutral in overall charge but contain a number of cationic (positive) charges equal to the number of anionic (negative charges). The cationic charge(s) may be contributed by one or more onium or inium cations of nitrogen, such as ammonium, pyridinium and imidazolinium cations; phosphorus, such as phosphonium; and/or sulfur, such as sulfonium. The anionic charge(s) may be contributed by one or more carbonate, sulfonate, phosphate, phosphonate, phosphinate or ethenolate anions, and the like. Suitable zwitterionic monomers include, but are not limited to, betaine monomers, which are zwitterionic and comprise an onium atom that bears no hydrogen atoms and that is not adjacent to the anionic atom.

In an embodiment, the repeating units derived from one or more zwitterionic monomers are repeating units derived from one or more betaine monomers selected from the group consisting of:

a) alkyl sulfonates or phosphonates of dialkylammonium alkyl acrylates or methacrylates, acrylamido or methacrylamido, typically
sulfopropyldimethylammonioethyl methacrylate,
sulfoethyldimethylammonioethyl methacrylate,
sulfobutyldimethylammonioethyl methacrylate,
sulfohydroxypropyldimethylammonioethyl methacrylate,
sulfopropyldimethylammoniopropylacrylamide,
sulfopropyldimethylammoniopropylmethacrylamide,
sulfohydroxypropyldimethylammoniopropyl(meth) acrylamide,
sulfopropyldiethylammonioethyl methacrylate;

b) heterocyclic betaine monomers, typically
sulfobetaines derived from piperazine,
sulfobetaines derived from 2-vinylpyridine and 4-vinylpyridine, more typically 2-vinyl-1-(3-sulfopropyl)pyridinium betaine or 4-vinyl-1-(3-sulfopropyl) pyridinium betaine,
1vinyl-3-(3-sulfopropyl)imidazolium betaine;

c) alkyl or hydroxyalkyl sulfonates or phosphonates of dialkylammonium alkyl allylics, typically sulfopropylmethyldiallylammonium betaine;

d) alkyl or hydroxyalkyl sulfonates or phosphonates of dialkylammonium alkyl styrenes;

e) betaines resulting from ethylenically unsaturated anhydrides and dienes;

f) phosphobetaines of formulae

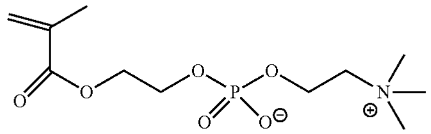

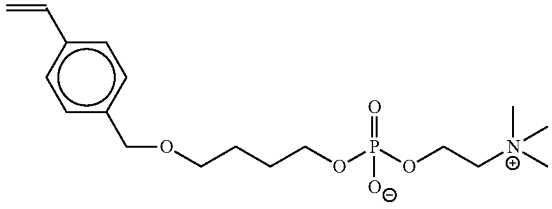

;

and g) betaines resulting from cyclic acetals, typically ((dicyanoethanolate)ethoxy)dimethylammoniopropylmethacrylamide.

In another embodiment, the repeating units derived from one or more zwitterionic monomers are repeating units derived from one or more betaine monomers selected from the group consisting of:
sulfopropyldimethylammonioethyl (meth)acrylate,
sulfoethyldimethylammonioethyl (meth)acrylate,
sulfobutyldimethylammonioethyl (meth)acrylate,
sulfohydroxypropyldimethylammonioethyl (meth)acrylate,
sulfopropyldimethylammoniopropylacrylamide,
sulfopropyldimethylammoniopropylmethacrylamide,
sulfohydroxypropyldimethylammoniopropyl(meth)acrylamide, and sulfopropyldiethylammonioethyl methacrylate.

In yet another embodiment, the repeating units derived from one or more zwitterionic monomers are repeating units derived from one or more betaine monomers selected from the group consisting of sulfohydroxypropyldimethylammonioethyl (meth)acrylamide and sulfopropyldimethylammonioethyl (meth)acrylate.

The polymer of the present disclosure may be obtained by any polymerization process known to those of ordinary skill. For example, the polymer may be obtained by radical polymerization or copolymerization, or controlled radical polymerization in aqueous solution, in dispersed media of one or more zwitterionic monomers, typically betaine monomers, containing at least one double bond-containing group. The zwitterionic monomers may be obtained from commercial sources or synthesized according to methods known to those of ordinary skill in the art.

Suitable zwitterionic monomers include, but are not limited to, betaine monomers selected from the group consisting of:

a) alkyl or hydroxyalkyl sulfonates or phosphonates of dialkylammonium alkyl acrylates or methacrylates, acrylamido or methacrylamido, typically:

sulfopropyldimethylammonioethyl methacrylate, sold by Raschig under the name SPE:

(SPE)

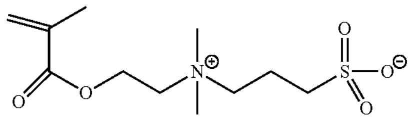

sulfoethyldimethylammonioethyl methacrylate,

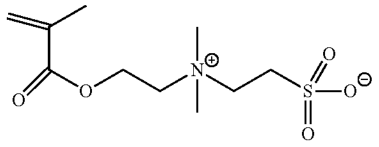 [SMILES: C=C(C)C(=O)OCC[N+](C)(C)CCS(=O)(=O)[O-]]

sulfobutyldimethylammonioethyl methacrylate:

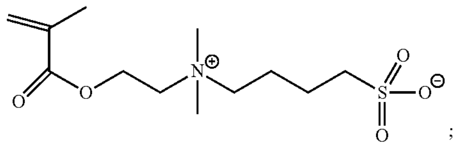 [SMILES: C=C(C)C(=O)OCC[N+](C)(C)CCCCS(=O)(=O)[O-]]

;

the synthesis of which is described in the paper "Sulfobetaine zwitterionomers based on n-butyl acrylate and 2-ethoxyethyl acrylate: monomer synthesis and copolymerization behavior", Journal of Polymer Science, 40, 511-523 (2002), sulfohydroxypropyldimethylammonioethyl methacrylate,

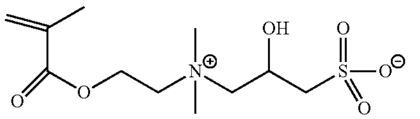 [SMILES: C=C(C)C(=O)OCC[N+](C)(C)CC(O)CS(=O)(=O)[O-]]

sulfopropyldimethylammoniopropylacrylamide, the synthesis of which is described in the paper "Synthesis and solubility of the poly(sulfobetaine)s and the corresponding cationic polymers: 1. Synthesis and characterization of sulfobetaines and the corresponding cationic monomers by nuclear magnetic resonance spectra", Wen-Fu Lee and Chan-Chang Tsai, Polymer, 35 (10), 2210-2217 (1994), sulfopropyldimethylammoniopropylmethacrylamide, sold by Raschig under the name SPP:

(SPP)

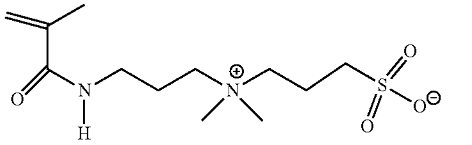

sulfohydroxypropyldimethylammoniopropylmethacrylamide:

(SHPP)

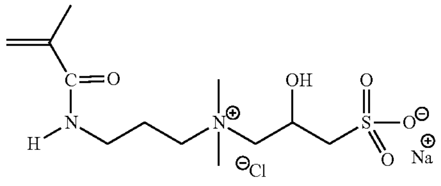

sulfohydroxypropyldimethylammoniopropylacrylamide (or 3-((3-acrylamidopropyl)dimethylammonio)-2-hydroxypropane-1-sulfonate):

(AHPS)

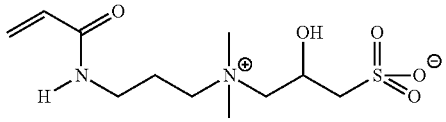

sulfopropyldiethylammonio ethoxyethyl methacrylate:

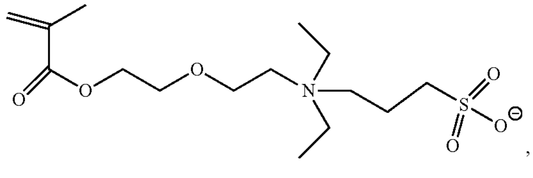

the synthesis of which is described in the paper "Poly (sulphopropylbetaines): 1. Synthesis and characterization", V. M. Monroy Soto and J. C. Galin, Polymer, 1984, Vol. 25, 121-128;

b) heterocyclic betaine monomers, typically:

sulfobetaines derived from piperazine having any one of the following structures

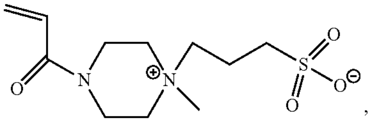

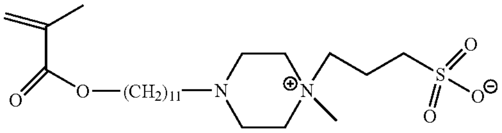

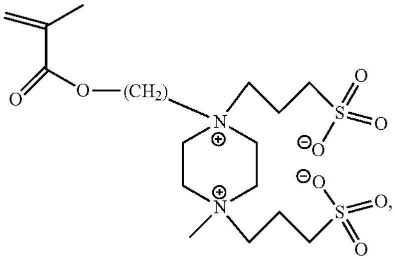

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), sulfobetaines derived from 2-vinylpyridine and 4vinylpyridine, such as 2-vinyl-1-(3-sulfopropyl) pyridinium betaine (2SPV), sold by Raschig under the name SPV:

(2SPV)

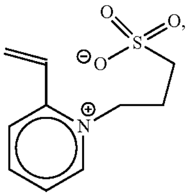

and 4-vinyl-1-(3-sulfopropyl)pyridinium betaine (4SPV), (4SPV)

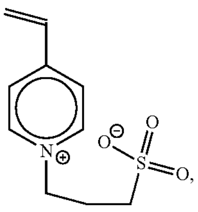

the synthesis of which is disclosed in the paper "Evidence of ionic aggregates in some ampholytic polymers by transmission electron microscopy", V. M. Castaño and A. E. González, J. Cardoso, O. Manero and V. M. Monroy, J. Mater. Res., 5 (3), 654-657 (1990), 1-vinyl-3-(3-sulfopropyl)imidazolium betaine:

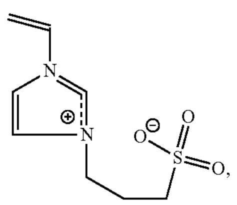

the synthesis of which is described in the paper "Aqueous solution properties of a poly(vinyl imidazolium sulphobetaine)", J. C. Salamone, W. Volkson, A. P. Dison, S. C. Israel, Polymer, 19, 1157-1162 (1978), c) alkyl or hydroxyalkyl sulfonates or phosphonates of dialkylammonium alkyl allylics, typically sulfopropylmethyldiallylammonium betaine:

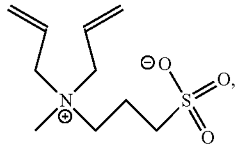

the synthesis of which is described in the paper "New poly(carbobetaine)s made from zwitterionic diallylammonium monomers", Favresse, Philippe; Laschewsky, Andre, Macromolecular Chemistry and Physics, 200 (4), 887-895 (1999), d) alkyl or hydroxyalkyl sulfonates or phosphonates of dialkylammonium alkyl styrenes, typically compounds having any one of the following structures:

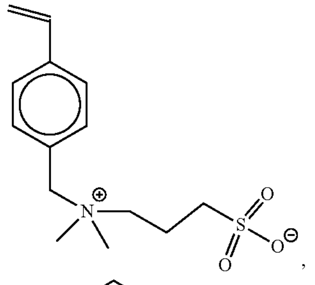

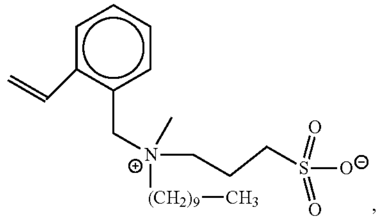

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), e) betaines resulting from ethylenically unsaturated anhydrides and dienes, typically compounds having any one of the following structures:

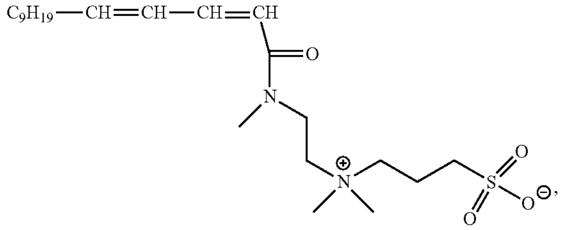

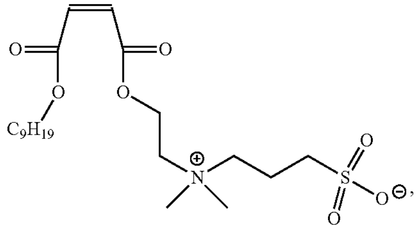

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), f) phosphobetaines having any one of the following structures:

(MPC)

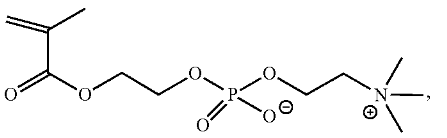

(VPC)

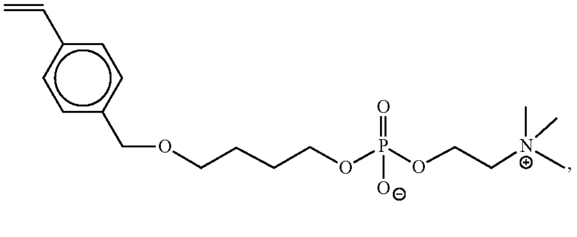

the synthesis of which are disclosed in EP 810 239 B1 (Biocompatibles, Alister et al.);

g) betaines resulting from cyclic acetals, typically ((dicyanoethanolate)ethoxy)dimethylammoniumpropylmethacrylamide:

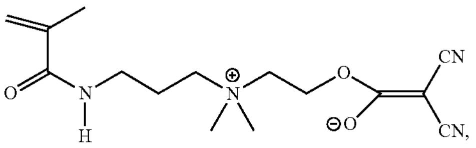 [SMILES: C=C(C)C(=O)NCCC[N+](C)(C)CCOC([O-])=C(C#N)C#N]

the synthesis of which is described by M-L. Pujol-Fortin et al. in the paper entitled "Poly(ammonium alkoxydicyanatoethenolates) as new hydrophobic and highly dipolar poly(zwitterions). 1. Synthesis", Macromolecules, 24, 4523-4530 (1991).

In another embodiment, one or more zwitterionic monomers are one or more betaine monomers selected from the group consisting of:

sulfopropyldimethylammonioethyl methacrylate,
sulfoethyldimethylammonioethyl methacrylate,
sulfobutyldimethylammonioethyl methacrylate,
sulfohydroxypropyldimethylammonioethyl methacrylate,
sulfopropyldimethylammoniopropylacrylamide,
sulfopropyldimethylammoniopropylmethacrylamide,
sulfohydroxypropyldimethylammoniopropyl(meth)acrylamide, and
sulfopropyldiethylammonioethyl methacrylate.

as a precursor polymer. For example, a polymer comprising repeating units derived from sulfobetaine may be obtained by chemical modification of a polymer comprising pendent amine functional groups with a sultone, such as propane sultone or butane sultone, a haloalkylsulfonate or any other sulfonated electrophilic compound known to those of ordinary skill in the art. Exemplary synthetic steps are shown below:

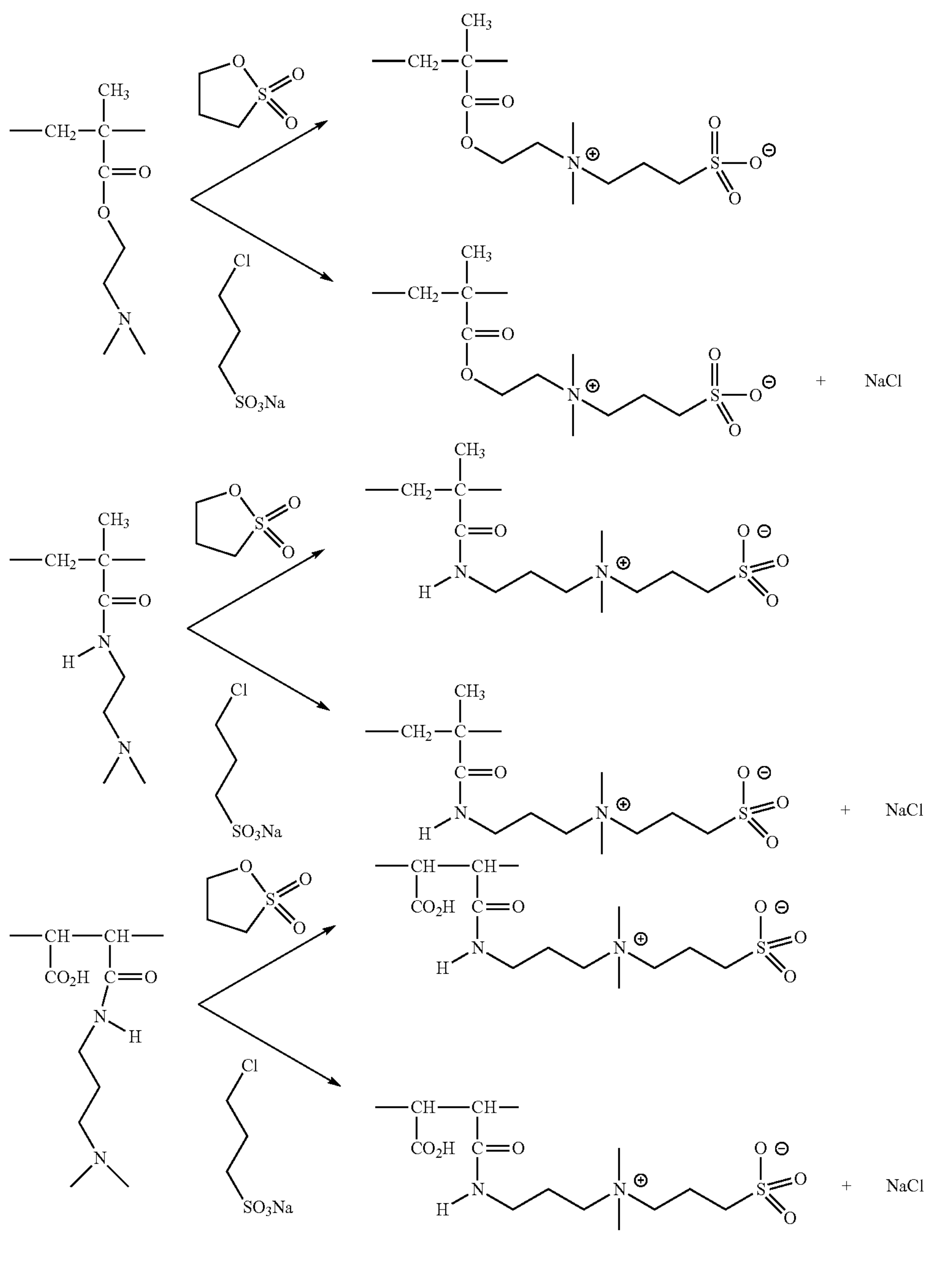

In an exemplary method, the polymer is obtained by radical polymerization or copolymerization using a radical initiator, such as 2,2'-azobis(2-methylbutyronitrile).

The polymer of the present disclosure may also be obtained by chemical modification of a polymer referred to The pH of the aqueous composition comprising the polymer having repeating units derived from one or more zwitterionic monomers is from 3 to 9, typically from 3 to 7, more typically from 5 to 7. The pH may be adjusted to be in the range of from 3 to 9, typically from 3 to 7, more typically from 5 to 7, by means well-known to those of ordinary skill in the art, such as, for example, by adding suitable quantities of acid or base.

The aqueous composition comprising the polymer having repeating units derived from one or more zwitterionic monomers may further comprise one or more water-miscible organic solvents. Suitable water-miscible organic solvents may be any of the water-miscible organic solvents already described herein.

The aqueous composition comprising the polymer having repeating units derived from one or more zwitterionic monomers may further comprise water-soluble salts, such as, for example, alkali metal halides and alkaline earth halides. There is no particular limitation to the amount of water-soluble salts present in the aqueous composition. However, the aqueous composition comprising the polymer having repeating units derived from one or more zwitterionic monomers may further comprise water-soluble salts in an amount of from about 0.01 to about 1.0 M, typically from about 0.1 to about 0.7 M.

The aqueous composition comprising the polymer having repeating units derived from one or more zwitterionic monomers may further comprise any of the buffering agents already described herein.

The aqueous composition comprising the polyphenol compound used in step a) may be contacted with the substrate using any coating method known to those of ordinary skill in the art. For example, the composition may be applied by spin casting, spin coating, dip casting, dip coating, spray coating, slot-die coating, curtain coating, ink jet printing, gravure coating, doctor blading, rod or bar coating, flowcoating, which involves controlled gravity flow of a coating over the substrate, or the like. Further examples include applying the composition onto a woven or nonwoven article and then contacting the woven or nonwoven article on the surface to be applied. Similarly, the aqueous composition comprising the polymer having repeating units derived from one or more zwitterionic monomers used in step b) may be contacted with the first layer using any coating method known to those of ordinary skill in the art, such as the methods described herein.

In an embodiment, step a) and/or step b) are each conducted by spin casting, spin coating, dip casting, dip coating, spray coating, slot-die coating, ink jet printing, gravure coating, or doctor blading. In an embodiment, step a) and step b) are each conducted by dip coating.

In another embodiment, step a) is conducted by dip coating, wherein the substrate is immersed in the aqueous composition comprising the polyphenol compound for 30 minutes to 24 hours, typically 1 to 6 hours, more typically 1 to 4 hours.

The method of the present disclosure may further comprise one or more washing steps. In an embodiment, the method further comprises washing the first layer formed in step a) prior to step b). In another embodiment, the method further comprises washing the second layer formed in step b).

In the method according to the present disclosure, the coating is applied to the substrate in an amount effective to reduce or prevent colloids adhesion and/or fouling. It has been discovered that a coating having a thickness suitable for reducing or preventing colloids adhesion and/or fouling on a substrate in need thereof may be formed by the method described herein without repetition of step a) or step b). Thus, in an embodiment, the method comprises performing step a) and step b) in sequence only once to achieve a coating having a thickness suitable for reducing or preventing colloids adhesion and/or fouling on the substrate.

In an embodiment, the thickness of the first layer formed in step a) is from 2 to 20 nm.

In another embodiment, the total thickness of the coating is from 4 to 50 nm, typically from 20 to 45 nm, more typically from 30 to 45 nm.

The substrate used in the method described herein is not particularly limited. However, suitable substrates include, but are not limited to, plastic, such as polyethers, polyesters such as polyethylene terephtalate (PET) or polybutylene terphtalate (PBT), polycarbonates such as bisphenol A polycarbonate, styrenic polymers such as poly(styrene-acrylonitrile) (SAN) or poly(acrylonitrile-butadiene-styrene) (ABS), poly(meth)acrylate such as polymethylmethacrylate (PMMA), polyamides, polysulfones such as polysulfone (PSU), polyethersulfone (PESU) or polyphenysulfone (PPSU), polyether ether ketone (PEEK), polyaryletherketone (PAEK), polypolyethylene (PE), polypropylene (PP), polyvinylchloride (PVC), polyurethane, and fiber-reinforced derivatives thereof and fluorinated derivatives thereof; metal, such as iron, cast iron, copper, brass, aluminum, titanium, gold, carbon steel ("C-steel"), stainless steel, and alloys thereof; materials containing multivalent metal cations, such as hydroxyapatite, calcium carbonate (amorphous, calcite, aragonite), calcium phosphate, calcium hydroxide, magnesium carbonate, and magnesium phosphate; silicate materials, such as quartz, glass, ceramics, such as earthenware, stoneware, porcelain, and the like. In an embodiment, the substrate comprises plastic, typically polyethylene, polypropylene, polycarbonate, or polyvinyl chloride; metal, typically aluminum, steel, or C-steel; or glass.

The substrate in need of reduction or prevention of colloids adhesion and/or fouling may be in contact with an aqueous medium. Herein, "aqueous medium" refers to a medium comprising or consisting of water. The aqueous medium may further comprise colloidal particles. Colloidal particles include inorganic colloids, such as, for example, clay particles, silicates, iron oxy-hydroxides and the like; organic colloids, such as proteins and humic substances; and colloidal living material, such as bacteria, fungi, archaea, algae, protozoa, and the like.

In an embodiment, the aqueous medium is selected from the group consisting of hydrotest water, oil and gas gathering waters, condensed waters, oil and gas production waters, fracturing waters, wash waters, food wash waters, metal degreasing fluids, deck fluids, water in oil and gas reservoirs, water in sump tanks, water in drains, and water in cooling towers. In other embodiments, the aqueous medium in contact with the substrate in need of reduction or prevention of colloids adhesion and/or fouling may be a biofluid, such as blood.

Since the coating described herein may increase susceptibility of colloidal living material, such as bacteria, fungi, archaea, algae, protozoa, and the like, to biocide, the aqueous medium may further comprise biocide.

Accordingly, the present disclosure is also directed to an article comprising a surface, wherein the surface is at least partially coated with the coating described herein.

In an embodiment, the article is a pipeline, a methane terminal; a medical device, typically medical tubing, orthopedic article, implantable device, drape, biosensor, dental implant, mechanical heart valve, extra-corporeal blood vessel, stent, or surgical tool; part of a heating and/or cooling system, typically heat exchanger, steam condenser, wet tower, or cooling tower; household equipment, such as sinks, toilets, urinals, bathtubs, and the like; a food contact surface, industrial equipment, degreasing tank bath, or architectural feature, such as ceramic tiles and other ceramic surfaces.

The article of the present disclosure is prepared by the method described herein. The features of the method described herein apply to the article, mutatis mutandis.

Mention may be made of the use of the coating described herein for reducing or preventing colloids adhesion and/or fouling on a substrate.

Should the disclosure of any patents, patent applications, and publications which are incorporated herein by reference conflict with the description of the present application to the extent that it may render a term unclear, the present description shall take precedence.

The methods and processes, including materials useful therefor, according to the present disclosure are further illustrated by the following non-limiting examples.

EXAMPLES

Example 1. Modification of Plastic Surfaces

Polypropylene (PP), polycarbonate (PC), and polyvinyl chloride (PVC) substrates were modified according to the following procedure.

Tannic acid (TA) powder (2 mg/mL) was dissolved in 0.1 M Bicine buffer containing 0.6M NaCl followed by pH adjustment to pH 7.8. The plastic substrate were each immersed into the TA solution for a desired amount of time (1, 2, 4, 7 and 22 h) and then washed with 0.01 M phosphate buffer at pH 7.4 ($1^{st}$ wash) and pH 5 ($2^{nd}$ wash). The modified surface was immersed in solution of hydrophilic polysulfobetaine polymer (poly(sulfopropyldimethylammonioethyl methacrylate; "pSPE"), 1 mg/m L, 0.17M NaCl, pH from 2 to 7] for 5 to 15 min followed by washing with 0.01 M phosphate buffer with 0.17 M NaCl. The modified surface was dried under $N_2$ or under ambient conditions on air.

With respect to the TA solution, 0.1 M Bicine buffer was also substituted with 0.01 M phosphate buffer or 0.1M Tris buffer, each with salt content (NaCl) from 0.3 M to 0.7 M, with the pH adjusted to a level of from 7 to 7.8 to achieve similar results.

Example 2. Modification of Metal Surfaces

Aluminum (A1203) coupons (either non-passivated or passivated by treatment with nitric acid) were first immersed in a solution of tannic acid (1 mg/mL in 0.1M bicine+0.6M NaCl) for 1 or 3.5 h. After the deposition, the coupons were washed twice with 0.01 M phosphate buffer at pH 7.4 ($1^{st}$ wash) and pH 5 ($2^{nd}$ wash). Hydrophilic polymer (pSPE, 1 mg/mL in 0.01M phosphate buffer+0.17M NaCl) was deposited at pH 5 by immersing the TA-coated coupons into the polymer solution for 5 or 15 min. The unattached polymer was removed by two washing steps with buffer at pH 5 (0.01M buffer+0.17 M NaCl). The coupons were air-dried.

Carbon steel substrate was similarly modified. Tannic acid was deposited from 0.1 mg/ml solution (0.01M phosphate buffer, pH 7.4) over a period of 7 min followed by washing with 0.01 M phosphate buffer (pH 7.4 and pH 5, two washes). Hydrophilic polymer was deposited under the same conditions as described for the aluminum coupons.

Example 3. Characterization of Coating Thickness

The thickness of the first layer of the coating (polyphenol-containing layer) was determined by using ellipsometry.

Silicon wafers were used for the ellipsometry measurements. Since tannic acid does not adhere well to silicon wafers, cleaned Si-wafers were first coated with polyethyleneimine by spin-coating. The primed wafers were then immersed in solutions of TA (2 mg/mL, 0.1 M bicine, 0.6M NaCl) for 20 min, 4 h and 24 h. After the deposition, the wafers were washed in 0.01 M phosphate buffer and air-dried prior to the ellipsometry measurements.

It was observed that the thickness of the tannic acid layer on the surface increased with increase in the deposition time from 4.5 nm (after 20 min) to about 20 nm (after 24 h).

Additionally, increase in layer thickness is not linear with time as the rate of polymerization of tannic acid is rapid during the first 4-5 hours and decreases due to a smaller amount of available phenolic groups.

The thickness of the coating, i.e., the first and second layers combined, was determined using X-ray reflectivity. The X-ray reflectivity measurements were performed at at the Center for Neutron Research (CNRC) in National Institute of Standard (NIST). The samples were deposited on 3", 5 mm thick Si-wafers as follows.

Poly(glycidyl methacrylate (PGMA) was deposited from a solution (0.01 mg/mL solution in chloroform) using spin-coating at 3000 rpm. After the deposition, the Si-wafers coated with PGMA were placed in an oven at 80° C. for 1 h to covalently attach the PGMA to the surface. After heating, the wafers were washed with chloroform (spin-coating at 3000 rpm) to remove unattached PGMA. Tannic acid and pSPE hydrophilic polymer (MW=1,600,000; dialyzed 50,000 cut off, against water) were deposited using procedures analogous to those described in Examples 1 and 2, in which the deposition time of TA deposition and pH of pSPE deposition were varied. The various conditions are summarized in Table 1 below.

TABLE 1

| Condition | TA deposition time (h) | pSPE deposition pH |
|---|---|---|
| 1 | 4 | 3 |
| 2 | 4 | 5 |
| 3 | 4 | 7 |
| 4 | 2 | 5 |
| 5 | 7 | 5 |
| 6* | 4 | — |

*TA only

X-ray reflectivity was performed on the samples at ambient conditions. The thickness of the tannic acid-polysulfobetaine systems calculated from the acquired reflectivity curves are summarized in Table 2 below.

TABLE 2

| Condition | Thickness (nm) |
|---|---|
| 1 | 7.27 |
| 2 | 33.85 |
| 3 | 42.15 |
| 4 | 32.65 |
| 5 | 36.94 |
| 6 | 35 |

At ambient humidity, the thickness for all systems, except those of condition 1 and 3, are around 30-35 nm, including thickness of the precursor. The thinnest coating was observed for condition 1, indicating that during deposition, exposure to the acidic pH may lead to removal of the stacked layer of tannic acid from the surface.

Example 4. pH Stability of Coating

The pH stability of the tannic acid-polysulfobetaine complex was investigated in solution, which gives an estimate on expected pH stability on surfaces. TA was complexed with pSPE and the pH was gradually increased every 20 min until the complex completely disintegrated as measured by UV-vis spectrophotometry using a UV-vis spectrophotometer in transmission mode.

TA complexes with low MW polysulfobetaines (MW ~7,000 and MW ~35,000) disintegrated at pH less than 6.5 to 7, indicating that the analogous coating on a surface would not be stable at pH above 7. On the other hand, TA complex with pSPE with high MW (from MW=1,500,000 to 2,000,000) showed pH stability up to 7.3 in solution, suggesting potential coating stability on surfaces up to pH 8.

To determine the stability of tannic acid-polysulfobetaine coatings on surfaces, the coating was deposited on quartz slides and changes in the coating were monitored using UV-vis spectrophotometry as pH was increased. The changes were monitored from 200-400 nm wavelength, where the tannic acid has strong adsorbing peaks (250-280 nm depending on ionization state) and hydrogen-bonded complex with polysulfobetaine can be seen as a shoulder (~300-320 nm).

The coating was found to be stable up to pH 8.1 for the high MW polymers (1,500,000; 1,600,000; and 2,000,000 g/mol).

Example 5. Long Term Stability at pH 7.1

On a Si-wafer primed with PGMA as in Example 3, TA/pSPE was deposited according to the following procedure. TA (2 mg/mL, 0.1 m Bicine+0.6M NaCl, depositon time 1 h) was deposited, sequentially washed with pH 7 and pH 5 buffer, immersed into a solution of pSPE (1 mg/mL, 0.17M NaCl in 0.01M phosphate buffer) for 5 min followed by washing with 0.17M NaCl/0.01M phosphate buffer at pH 5 twice.

The air-dried coating was immersed in a 0.5 M NaCl solution containing 0.01 M phosphate buffer to keep the pH stable. The pH was adjusted to pH 7.1. The stability of the coating was monitored by measuring the thickness using a spectroscopic ellipsometer after a time. Samples were removed from the salt solution, rinsed with DI water, and dried in air and $N_2$ before measurements were made. The thickness measurements are summarized in Table 3 below.

TABLE 3

| Time | Thickness (nm) |
|---|---|
| No exposure | 35.6 |
| 1 h | 35.08 |
| 4 h | 35.38 |
| 24 h | 36.07 |
| 6 days | 37 |
| 7 days | 37.6 |

As shown in Table 3, the thickness of the inventive coating remained stable for up to 7 days.

Example 6. Synthesis of a Suitable Hydrophilic Polymer (Polysulfobetaine with MW=1,500,000)

In a 500 mL kettle reactor equipped with a water condenser and a mechanical agitation, are introduced, at room temperature (around 25° C.), 4 g of sodium sulfate (>99% purity), 100 g of monomer SPE (97% purity), and 289.69 g of distilled water. The mixture was degassed by bubbling nitrogen in the bulk for 1 hour while the temperature in the solution was increasing until 70° C. After temperature equilibration in the kettle reactor (around 70° C.), and under a nitrogen blanket, was introduced 16.18 g of an aqueous V50 solution at 12 wt %. V50 is a water soluble free radical initiator 2,2'-azobis(2-methylpropionamidine)dihydrochloride available from Wako Specialty Chemicals. The reaction was maintained at 70° C. for 7 hours before increasing the temperature until 80° C. during 2 hours. Then, the temperature was decreased until 50° C. during 2 hours and again at 25° C. during 1 hour.

At the end of the polymerization, a sample was taken for $^1H$ analysis to determine the SPE monomer conversion. A sample was also taken for size exclusion chromatography analysis to determine the number average molar mass Mn, the weight average molar mass Mw and the dispersity. After cooling the reaction, the solid content was measured around 26 wt %.

SPE monomer conversion ($^1H$ NMR)=99.9%

$\overline{M}_{n(SEC\text{-}MALS)}$=224,000 g·mol$^{-1}$ $\overline{M}_{w(SEC\text{-}MALS)}$=1 470,000 g·mol$^{-1}$

Đ=6.6

Example 7. Reduction of Biofilm Adhesion

The ability of the coating made according to Example 1 to reduce biofilm adhesion by bacteria *P. aeruginosa* 9027 was evaluated.

PVC coupons were modified according to the procedure described in Example 1, except that the tannic acid deposition time was varied at 30 min, 1 h or 2 h. As a control, pristine (uncoated) PVC coupons were used. All coupons before use were washed with ethanol by sonicating the coupons for 30 min (the washing step was repeated twice with fresh ethanol). Ethanol-washed coupons were dried before use. The control and coated coupons were tested in triplicates, and an extra coupon was used for imaging and quantification using confocal microscope.

The control and coated coupons were placed in a CDC reactor, which was filled with tryptic soy broth (TSB) (300 mg/L) and inoculated with overnight culture of *P. aeruginosa* 9027 and left for 24 h at room temperature to facilitate biofilm formation. Results obtained from the CDC reactor are summarized in Table 4 below.

TABLE 4

| TA deposition time | Log CFU | Areal coverage (%) |
|---|---|---|
| —* | 5.97 | 2.4 |
| 30 min | 5.44 | 1.4 |
| 1 h | 5.28 | 0.75 |
| 2 h | 5.26 | 1.2 |

*control (uncoated)

As shown in Table 4, confocal imaging (areal coverage) and plate counts (log CFU) are in agreement, and the reduction in biofilm adhesion was observed for all tested samples. Of the tested surfaces, the one made with tannic acid deposition time of 1 h showed the best performance.

The PVC coupon having the coating made with a tannic acid deposition time of 1 h was tested against environmental bacterial strains. The substrates (control and coated coupon) were placed in a CDC reactor, which was filled with water spiked with (TSB) (final concentration of TSB 300 mg/L to promote growth and left for 24 h at room temperature to facilitate biofilm formation. The coupons were imaged with confocal microscope and images were analyzed with Matlab and Image J. The control exhibited 24,921 bright pixels/area while the coated coupon exhibited 55 bright pixels/area. The difference between numbers of bright pixels/area corresponds to 2.48 log of biofilm reduction on the coated coupon as compared to the control.

Example 8. Biocide Susceptibility

As used herein, biocide susceptibility refers to the ability of a biocide (at certain concentrations) to kill biofilm or living material that form biofilm after a specific time of contact. To test biocide susceptibility, substrates were coated with tannic acid [2 mg/ml solution (pH 7.8) in 0.1 M Bicine buffer+0.6 M NaCl] for 2 h or 4 h. The excess of tannic acid was washed with buffer (0.01 M phosphate buffer) twice. The first rinsing step is at pH 7.4 and the second step is pH 7.4 or pH 5. PolySPE (1 mg/mL in 0.01M phosphate buffer+0.17M NaCl) was deposited at pH 5 or pH 7 by immersing the substrates into the polymer solution for 15 min. Any unattached polymer was removed by two washing steps with buffer at pH 5 or pH 7 (0.01M buffer+0.17 M NaCl). The substrates were air-dried. As a control, substrates having only tannic acid (4 h deposition) and substrates having no coating were used.

The substrates were placed in a CDC reactor, which was filled with 348.250 mL of Jemeppe water spiked with 1.75 mL of 2×TSB and left for 24 h at room temperature to facilitate biofilm formation. After 24 h, the rods with substrates were washed with 30 mL sterile PBS buffer and the substrates were transferred into sterile 50-mL centrifuge tubes. Disinfectant (bleach) at 10 ppm concentration was prepared using chlorine standards immediately prior to use. 4 mL of 10 ppm solution was added into the centrifuge tubes and allowed to interact for 10 min. After 10 min, 36 mL of Dey-Engley neutralization broth was added and shaken vigorously to neutralize remaining chlorine. After neutralization, the tubes were vortexed and sonicated for 30 sec (3 times). The serial dilutions (10× dilutions) were performed for each substrate and plated on Hardi agar plates (R2A), allowing the cultures to grow for 48 h at room temperature before counting.

In one trial, polyvinyl chloride (PVC) substrates were prepared using tannic acid (4 h deposition) and polySPE (MW 1,500,000, undialyzed; deposited at pH 5) and evaluated according to the procedure in the present example. The PVC substrates showed ~2 log biofilm reduction compared to ~1 log reduction in the control substrates when contacted with 10 ppm of bleach for 10 minutes.

In another trial, PVC coupons coated with TA (2 h deposition) and pSPE (5 min deposition at pH 5) showed a 0.8 log reduction of biofilm reduction compared to unmodified substrate.

In another trial, polypropylene (PP) coupons were coated under various conditions, which are summarized in Table 5 below.

TABLE 5

| Condition | TA deposition time (h) | pSPE deposition pH |
|---|---|---|
| 2 | 4 | 5 |
| 3 | 4 | 7 |
| 4 | 2 | 5 |
| 6* | 4 | — |
| 7† | — | — |

*TA only
†uncoated

It is noted that PP floats in aqueous solution. Therefore, all PP coupons were exposed to bleach with the coated side floating face down for 10 min.

After 24 h at room temperature, the biofilm was formed on all PP coupons at ~6.78 log. While treatment with 10 ppm of bleach resulted in biofilm reduction on all modified and uncoated PP coupons, the largest log reduction (~2.4 log) was observed for PP substrate made by condition 4. Control substrate (uncoated PP) exhibited only ~1.6 log reduction.

Example 9. pH Stability of Coating (Comparative)

The pH stability of a dopamine-polysulfobetaine complex was investigated in solution in a manner analogous to Example 4.

The testing was done in solution by mixing the same amount (1:1 weight ratio of dopamine and pSPE). After the mixing, the solution remained clear, regardless of the pH (pH range tested: pH 4 to pH 9) suggesting that formation of a coating by a two-step deposition may not be possible for this system.

Example 10. Characterization of Coating Thickness (Comparative)

The formation of a coating using dopamine in place of tannic acid and pSPE was investigated. The coating deposition and thickness characterization was conducted according to a procedure similar to Example 3.

Si-wafer was modified with polyglycidylmethacrylate (PGMA) and the resulting PGMA-modified wafer was immersed in a solution of dopamine (2 mg/mL, pH 8.6) for 6 h and, after the modification, the thickness of the deposited dopamine layer was measured with ellipsometry. The measured thickness was 10.5 nm.

Subsequently, the wafer modified with dopamine was immersed in a solution of pSPE (pH5, 0.17 M NaCl+0.01 M phosphate buffer) for 5 min followed by washing with buffer with 0.17 M NaCl twice and air-dried. After air-drying, the thickness was measured. The thickness was determined to be 10.45 nm suggesting that the pSPE hydrophilic polymer did not adsorb onto the polydopamine layer.

What is claimed is:

1. A method for reducing or preventing colloids adhesion and/or fouling on a substrate in need thereof, the method comprising forming a coating having a first and a second layer on the substrate by:

a) contacting the substrate with a first aqueous composition comprising a polyphenol compound at a concentration ranging from 0.1 mg/mL to 10 mg/mL, wherein the pH of the first aqueous composition is above 7, to form the first layer, washing the first layer formed in step a) prior to step b), and b) contacting the first layer formed in step a) with a second aqueous composition different from the first aqueous composition, and comprising a polymer having repeating units derived from one or more zwitterionic betaine monomers, wherein the pH of the second aqueous composition ranges from 5 to 7, to form the second layer; thereby forming the coating for reducing or preventing colloids adhesion and/or fouling on the substrate, wherein the polyphenol compound is tannic acid wherein the first aqueous composition does not comprise polymer having repeating units derived from one or more zwitterionic monomers, and wherein the second aqueous composition does not comprise polyphenol compound.

2. The method according to claim 1, wherein the polymer is a homopolymer.

3. The method according to claim 1, wherein the polymer is a copolymer.

4. The method according to claim 1, wherein the weight-average molar mass (Mw) of the polymer is in the range of from about 5,000 to about 3,000,000 g/mol.

5. The method according to claim 1, wherein the repeating units derived from one or more zwitterionic monomers are repeating units derived from one or more betaine monomers selected from the group consisting of:

a) alkyl sulfonates or phosphonates of dialkylammonium alkyl acrylates or methacrylates, acrylamido or methacrylamido;

b) heterocyclic betaine monomers;

c) alkyl or hydroxyalkyl sulfonates or phosphonates of dialkylammonium alkyl allylics;

d) alkyl or hydroxyalkyl sulfonates or phosphonates of dialkylammonium alkyl styrenes;

e) betaines resulting from ethylenically unsaturated anhydrides and dienes;

f) phosphobetaines of formulae;

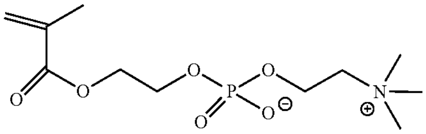

-continued

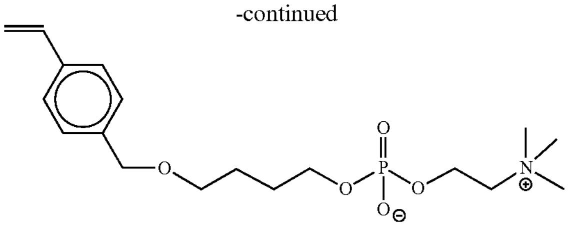

and g) betaines resulting from cyclic acetals.

6. The method according to claim 1, wherein the repeating units derived from one or more zwitterionic monomers are repeating units derived from one or more betaine monomers selected from the group consisting of:

sulfopropyldimethylammonioethyl (meth)acrylate,
sulfoethyldimethylammonioethyl (meth)acrylate,
sulfobutyldimethylammonioethyl (meth)acrylate,
sulfohydroxypropyldimethylammonioethyl (meth)acrylate,
sulfopropyldimethylammoniopropylacrylamide,
sulfopropyldimethylammoniopropylmethacrylamide,
sulfohydroxypropyldimethylammoniopropyl(meth)acrylamide, and
sulfopropyldiethylammonio ethoxyethyl methacrylate.

7. The method according to claim 1, wherein the pH of the aqueous composition comprising the polyphenol compound is from above 7 to 9.

8. The method according to claim 1, wherein the substrate comprises plastic, metal, materials containing multivalent metal cations, and/or silicate materials.

9. The method according to claim 1, wherein step a) and/or step b) are each conducted by spin casting, spin coating, dip casting, dip coating, spray coating, slot-die coating, inkjet printing, gravure coating, or doctor blading.

10. The method according to claim 1, wherein step a) is conducted by dip coating, wherein the substrate is immersed in the aqueous composition comprising the polyphenol compound for 30 minutes to 24 hours.

11. The method according to claim 1, further comprising washing the second layer formed in step b).

12. The method according to claim 1, wherein the thickness of the first layer formed in step a) is from 2 to 20 nm.

13. The method according to claim 1, wherein the total thickness of the coating is from 4 to 50 nm.

* * * * *